(12) United States Patent
Dagh et al.

(10) Patent No.: US 6,330,937 B1
(45) Date of Patent: Dec. 18, 2001

(54) WHEEL HUB AND BRAKE DISC ARRANGEMENT FOR HEAVY VEHICLES

(75) Inventors: Ingemar Dagh, Gothenburg; Anders Carlsson, Torslanda, both of (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/744,745
(22) PCT Filed: Jul. 28, 1999
(86) PCT No.: PCT/SE99/01323
§ 371 Date: Mar. 15, 2001
§ 102(e) Date: Mar. 15, 2001
(87) PCT Pub. No.: WO00/06922
PCT Pub. Date: Feb. 10, 2000

(30) Foreign Application Priority Data

Jul. 28, 1998 (SE) .................................... 9802634

(51) Int. Cl.⁷ ........................................ B60T 1/06
(52) U.S. Cl. .................... 188/18 A; 188/218 XL; 301/6.8
(58) Field of Search .................. 188/17, 73.31, 188/18 A, 218 XL; 301/105.1, 124.1, 125, 126, 131, 6.8

(56) References Cited

U.S. PATENT DOCUMENTS

| 3,860,095 | | 1/1975 | Morris . | |
|---|---|---|---|---|
| 4,186,824 | | 2/1980 | Preston et al. . | |
| 5,507,367 | * | 4/1996 | Dagh et al. | 188/18 A |
| 5,540,303 | * | 7/1996 | Bodin et al. | 188/18 A |
| 5,568,846 | * | 10/1996 | Dagh et al. | 188/218 XL |

FOREIGN PATENT DOCUMENTS

| 0 875 433 | 11/1998 | (EP) . |
|---|---|---|
| 2 194 288 | 3/1988 | (GB) . |

* cited by examiner

*Primary Examiner*—Christopher P. Schwartz
*Assistant Examiner*—Melanie Torres
(74) *Attorney, Agent, or Firm*—Young & Thompson

(57) ABSTRACT

A wheel hub and brake disc device for a vehicle wheel, comprising a wheel hub journalled on an axle and having outer splines meshing with inner splines on a brake disc supported on the wheel hub. The disc is prevented from displacement in one axial direction by a broken retainer ring (14), which is located in a peripheral groove. One end portion (17) of the ring is bent radially inwards to form a lock pin, which protrudes into a spline groove to prevent the ring from rotation.

5 Claims, 2 Drawing Sheets

WHEEL HUB AND BRAKE DISC ARRANGEMENT FOR HEAVY VEHICLES

Figure 1:
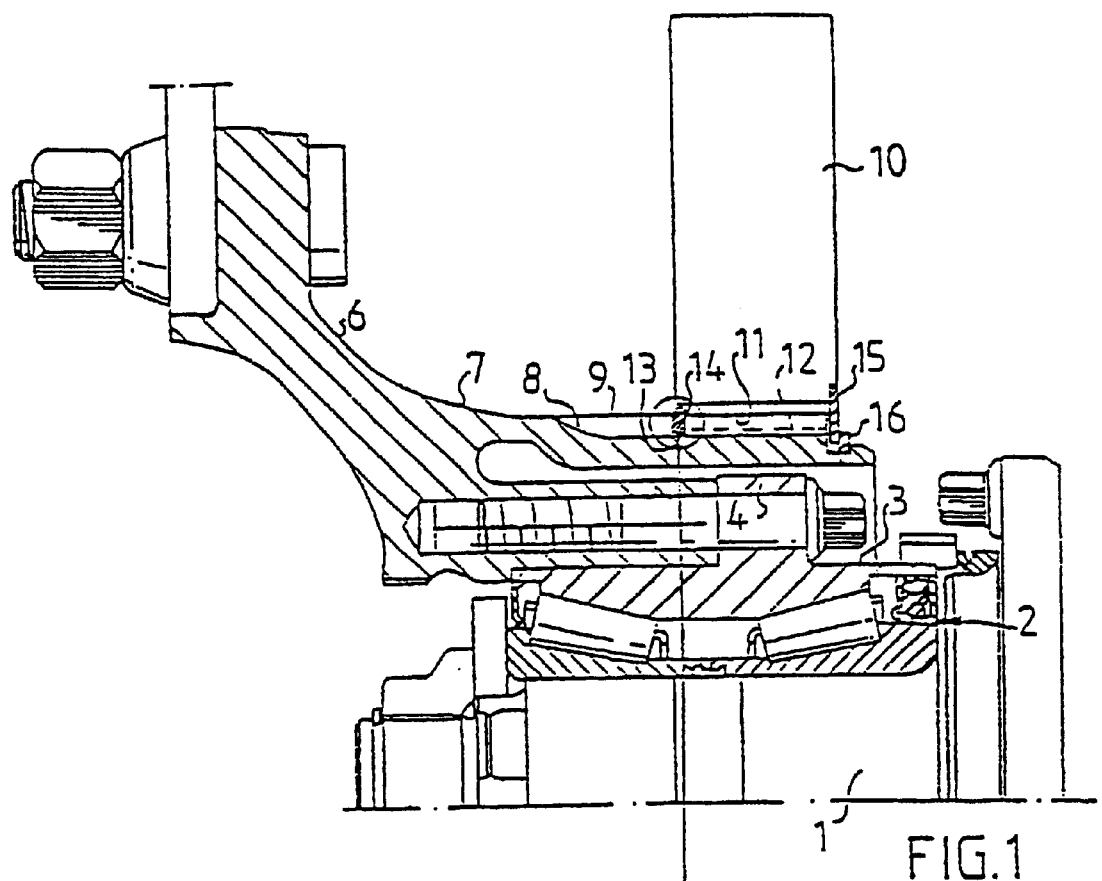

The present invention relates to a wheel hub and brake disc device for a vehicle wheel, comprising a hub portion mounted via bearing means on an axle end, said hub portion having a cylindrical neck portion with alternating axial grooves and bars, a brake disc having a central opening with corresponding grooves and bars, engaging the bars and grooves in the neck portion to fix rotationally the brake disc on the hub portion, and an open retainer ring, held in a peripheral groove in the neck portion for axially fixing the brake disc in one direction on the hub portion.

SE-A-9201710-2 and SE-A-9602385-8 describe as known, wheel hub and brake disc devices, in which the neck portion of the hub is provided with external splines engaging internal splines in a central opening in the brake disc. The brake disc is fixed axially between outer and inner retainer rings disposed in grooves in the neck portion of the hub. The inner retainer ring fixes a resilient ring, which is in contact with the hub and the disc and permits limited axial movement between the disc and the hub, to compensate for tolerances and deformation occurring in the components when braking. The outer retainer ring is disposed in direct contact with a side surface of the brake disc and forms a rigid end abutment, which limits the outward axial movement of the disc.

As shown in the examples, retainer rings are used either with rectangular cross section (SE-A-9201710-2) or circular cross section (SE-A-9602385-8). Both are open rings with end portions, having end surfaces facing each other, and both have both advantages and disadvantages. The surface pressure of the rectangular ring against the brake disc is lower than that of the ring with circular cross section, but it can, on the other hand, under certain conditions, expand when there is relative movement between the hub and the disc, due to a sort of climbing effect between the retainer ring and the disc. This effect is avoided with a ring of circular cross section, but the surface pressure increases on the other hand. None of the retainer rings has fixation rings for preventing rotation relative to the hub and the disc, and this means that the increased surface pressure with the circular cross section results in increased wear.

The purpose of the present invention is in general to achieve a wheel hub and brake disc device of the type described by way of introduction, which has a retainer ring arrangement, which provides lower wear than the known solution described above with a retainer ring with circular cross section, at the same time as one eliminates the climbing effect with the risk that the ring will jump out of its position.

This is achieved according to the invention by virtue of the fact that the retainer ring has end portions facing each other, of which at least one is bent radially inwards and extends into a recess in the neck portion to fix rotationally the retainer ring on the neck portion.

A ring rotationally fixed in this manner eliminates wear caused by friction due to movement, and this means that despite the higher surface pressure, it is possible to use a ring of circular cross section and which does not have the tendency to climb of the ring having rectangular cross section.

In a further development of the device according to the invention, the brake disc has a peripheral groove in conjunction with its central opening, said peripheral groove having a profile adapted to the cross-sectional profile of the retainer ring, with a peripheral surface, which projects over and is disposed slightly spaced from the radially outer surface of the retainer ring to prevent the retainer ring from expanding radially. This permits the use of a ring with a flat surface in contact with the brake disc, which provides low surface pressure and minimum wear without any risk that its position relative to the hub and the brake disc will be changed.

Figure 3:
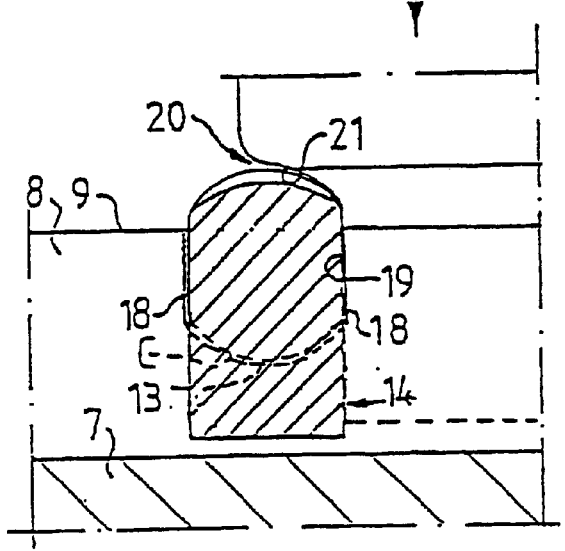
Figure 2:
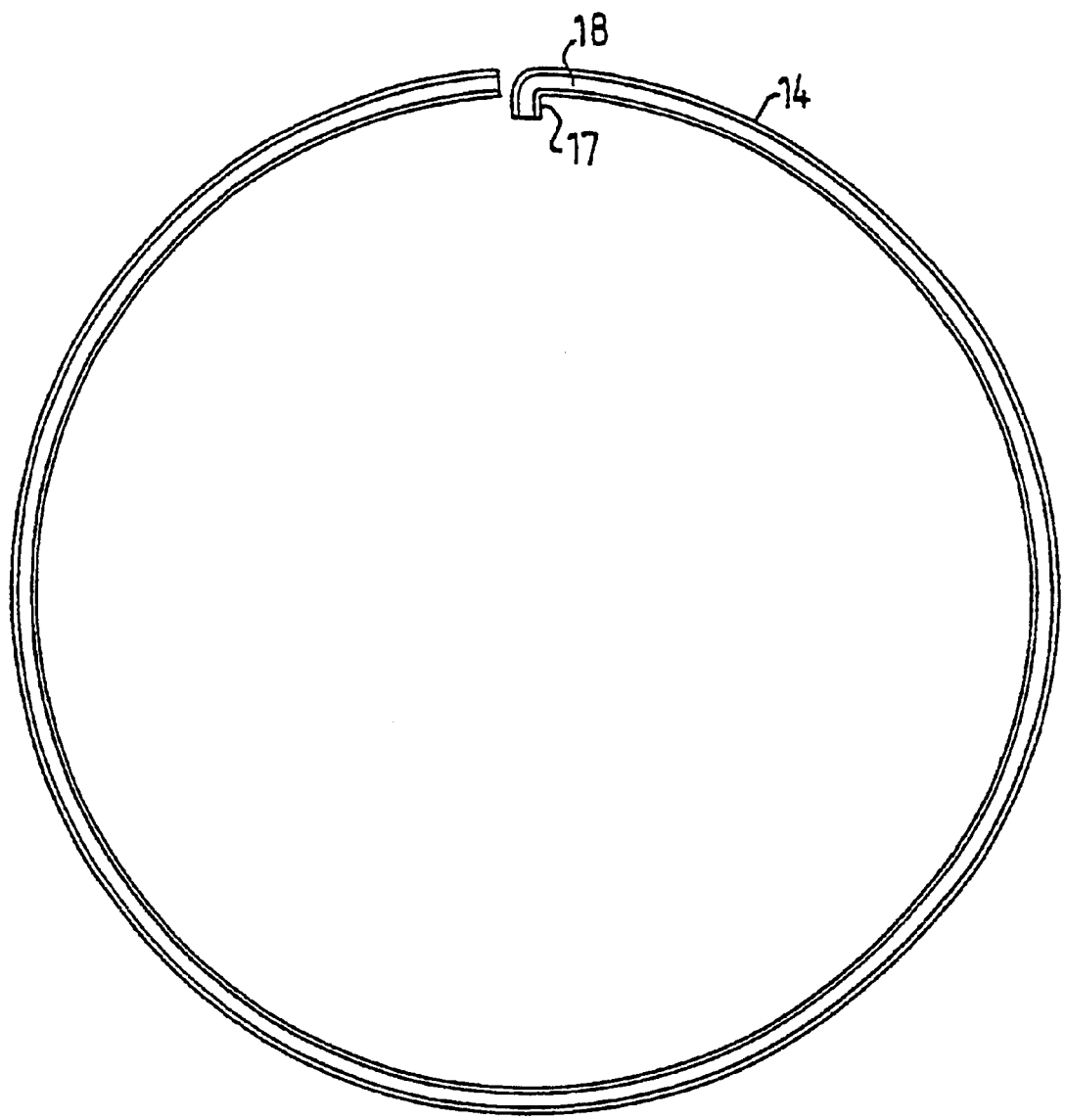

The invention will be described in more detail below with reference to examples shown in the accompanying drawings, where FIG. 1 shows a longitudinal section through one embodiment of a wheel hub and brake disc device according to the invention, FIG. 2 is a side view of the outer retainer ring of the device, and FIG. 3 is an enlargement of the circled area in FIG. 1.

The wheel hub and brake disc device in FIG. 1, comprises an axle end 1, supporting a so-called unit bearing generally designated 2, the outer ring 3 of which is provided with an annular flange 4 forming a portion of the wheel hub. To the flange 4 there is screwed fast a disc-shaped supporting element 6, a so-called wheel disc, which has a neck portion 7 integral therewith, the outer lateral surface of which is made with alternating V-shaped axial spline grooves and bars 8,9. A brake disc 10 has a central opening with corresponding axial grooves and bars 11,12 engaging the bars and grooves 9,8 of the neck portion 7 to rotationally fix the brake disc.

The disc 10 is axially loaded against an outer retainer ring 14 disposed in a peripheral groove 13 in the bars 9 of the hub neck 7 by a spring ring 15 which is locked against an inner end surface of the disc 10 and the hub neck 7 by an inner retainer ring 16. In the example shown in FIG. 3, the depth of the groove 13 is approximately one half of the height of the axial grooves and bars 8,9. As can be seen in FIG. 2, the retainer ring 14 is broken, so that it can expand for mounting. One end portion 17 thereof is bent down towards the centre of the retainer ring and forms a lock pin, the length of which from the radial inner surface of the ring being approximately equal to the diameter of the basic circle c providing the cross sectional profile of the ring, as can be seen in more detail in FIG. 2 and in the enlarged section in FIG. 3. The pin 17 extends down into an axial groove 8 between two bars 9 and thereby prevents the retainer ring from rotating relative to the hub portion 7 and the brake disc 10.

The retainer ring 14 in the example shown has an essentially circular cross sectional profile with opposite planar lateral surfaces 18, one of which forms an abutment surface to a flat lateral surface 19 of a circular groove 20 disposed near the central opening of the brake disc. The depth of the groove 20 is approximately equal to the radius of the basic circle c of the cross sectional profile of the ring 16. The flat lateral surface 19 of the groove 20 is connected to a curved wall portion 21, the radius of curvature of which is approximately equal to the radius of curvature of the basic circle c. As can be seen in the enlargement of FIG. 3, there is only a small play between the outer surface of the ring 14 and the wall portion 21 of the groove, which means that the ring 14 cannot expand more what this play permits.

In sum, this means that the rotational fixation, together with the relatively low surface pressure as compared with a completely circular ring, will provide very low wear to the opposing surfaces of the ring and the disc, while the surface portion 21 of the groove 20 eliminates any possibility for the ring to expand enough to jump out of the groove 13 in the bars 9.

For ease of manufacture, the retainer ring 14 has two opposing planar surfaces 18 but for its function, it would be enough that the surface 19 facing the disc 10 is flat. Within the scope of the basic idea of the invention, the ring could be entirely circular, square or rectangular in cross section. For the latter two cross-sectional profiles, it is advantageous to avoid sharp corners between the sides. The cross-sectional profile shown in the drawings with a circular basic shape and flattened opposing lateral surfaces has, however, proved to be optimal with regard to function and manufacture.

What is claimed is:

1. Wheel hub and brake disc device for a vehicle wheel, comprising a hub portion (7) mounted via bearing means (2) on an axle end (1), said hub portion having a cylindrical neck portion (7) with alternating axial grooves (8) and bars (9), a brake disc (10) having a central opening with corresponding grooves (11) and bars (12), engaging the bars (9) and grooves (8) in the neck portion to fix rotationally the brake disc on the hub portion, and an open retainer ring (14), held in a peripheral groove (13) in the neck portion for axially fixing the brake disc in one direction on the hub portion, characterized in that the retainer ring (14) has end portions facing each other, of which at least one (17) is bent radially inwards and extends into a recess (8) in the neck portion (7) to fix rotationally the retainer ring on the neck portion.

2. Device according to claim 1, characterized in that the brake disc (10) has a peripheral groove (20) in conjunction with its central opening, said peripheral groove having a profile adapted to the cross-sectional profile of the retainer ring, with a peripheral surface (21), which projects over and is disposed slightly spaced from the radially outer surface of the retainer ring (14) to prevent the retainer ring from expanding radially.

3. Device according to claim 1, characterized in that the retainer ring (14) has a cross-sectional profile, which deviates from a purely rectangular or circular profile.

4. Device according to claim 3, characterized in that the retainer ring (14) has a planar lateral surface (18), which faces and is parallel to a planar lateral surface (19) of the peripheral groove (20) in the brake disc (10).

5. Device according to claim 4, characterized in that the retainer ring (14) has opposing parallel planar lateral surfaces (18).

* * * * *